United States Patent [19]

Page et al.

[11] Patent Number: 5,376,147

[45] Date of Patent: Dec. 27, 1994

[54] PROCESS FOR DYEING LEATHER WITH DYE MIXTURES

[75] Inventors: Campbell Page, Basel; Peter Moser, Binningen; Alois Püntener, Rheinfelden, all of Switzerland

[73] Assignee: Ciba-Geigy Corporation, Ardsley, N.Y.

[21] Appl. No.: 25,214

[22] Filed: Feb. 26, 1993

[30] Foreign Application Priority Data

Feb. 28, 1992 [CH] Switzerland ............... 622/92

[51] Int. Cl.$^5$ .............................................. D06P 3/32
[52] U.S. Cl. ........................................ 8/437; 8/436; 8/641; 8/602
[58] Field of Search ............. 8/437, 436, 641, 687, 8/924, 602

[56] References Cited

U.S. PATENT DOCUMENTS

| | | | |
|---|---|---|---|
| 2,156,887 | 5/1939 | Weinand et al. | 260/374 |
| 4,318,859 | 3/1982 | Hermann | 260/388 |
| 4,452,602 | 6/1984 | Püntener et al. | 8/436 |
| 4,537,598 | 8/1985 | Schaetzer et al. | 8/924 |
| 4,563,192 | 1/1986 | Salathé et al. | 8/687 |
| 5,032,142 | 7/1991 | Egger et al. | 8/549 |
| 5,045,084 | 9/1991 | Walter | 8/924 |
| 5,152,801 | 10/1992 | Altermatt et al. | 8/436 |

FOREIGN PATENT DOCUMENTS

| | | |
|---|---|---|
| 012283 | 12/1978 | European Pat. Off. . |
| 433229 | 6/1991 | European Pat. Off. . |
| 524520 | 1/1993 | European Pat. Off. . |
| 810605 | 7/1938 | France . |
| 2032391 | 11/1970 | France . |
| 2160473 | 6/1973 | France . |
| 1794288 | 11/1971 | Germany . |
| 174541 | 4/1935 | Switzerland . |
| 175893 | 6/1935 | Switzerland . |
| 1260262 | 1/1972 | United Kingdom . |
| 1417428 | 10/1975 | United Kingdom . |

OTHER PUBLICATIONS

Chem. Abst. 93-028607/04 of EP 524,520; Jan. 27, 1993.
Chem. Abst. 68-95928p/00 of DD 1,794,288; Nov. 18, 1971.
Chem. Abst. Dyes and Textile Chem. (1936) 293.
Dyes and Textile Chem. 294 Abstract of CH 174,541; Apr. 1, 1935.
Colour Index, 3rd Edition, vol. 4 p. 4233; 1971.

*Primary Examiner*—Paul Lieberman
*Assistant Examiner*—Caroline L. Dusheck
*Attorney, Agent, or Firm*—Kevin T. Mansfield

[57] ABSTRACT

Dye mixtures comprising at least two metal-free dyes of different colors having in each case two sulfo or carboxyl groups and a molecular weight of between 790 and 1100 are used for dyeing leather. A trichromatic dye mixture comprising at least one yellow dye of the formula (1), at least one red dye of the formula (2) and at least one blue dye of the formula (3) according to claim 2 is preferably used. Leather can be dyed in brilliant shades using these dye mixtures.

28 Claims, No Drawings

PROCESS FOR DYEING LEATHER WITH DYE MIXTURES

The present invention relates to a process for dyeing leather with dye mixtures, in particular a process for trichromatic dyeing of leather, and the leather dyed by the process.

Processes for dyeing leather with dye mixtures, including trichromatic dyeing of leather, are already known and are also used very successfully in practice. However, the known dye mixtures are of only limited suitability for dyeing in brilliant shades, and trichromatic dyeing in brilliant shades has not hitherto been possible using the known dye mixtures. In particular, for trichromatic dyeing, particular requirements are imposed on the dyes used to be combined, in order to guarantee a uniform colour build-up to achieve reproducible dyeings of constant shade in different concentrations. Furthermore, the conditions mentioned should be met for types of leather of different origin and different pretreatment.

The present invention was based on the object of providing a process for dyeing leather with dye mixtures, by which dyeing in brilliant shades is possible. Particularly suitable dye mixtures moreover should also allow trichromatic dyeing of leather in brilliant shades.

This object is achieved by the process according to the invention.

The invention thus relates to a process for dyeing leather with dye mixtures, which comprises employing at least two metal-free dyes having in each case two sulfo or carboxyl groups and a molecular weight of between 790 and 1100.

In a preferred embodiment of the process according to the invention, at least two dyes selected from the group comprising a) a yellow dye of the formula

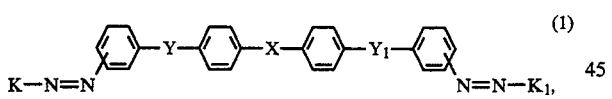

(1)

in which
Y and $Y_1$ independently of one another are each $-SO_2O-$, $-COO-$, $-CONH-$ or $-SO_2NH-$, X is $-C_1-C_4$alkylene, $-CH=CH-$, $-O-$, $-S-$, $-SO_2-$, $-NH-$,

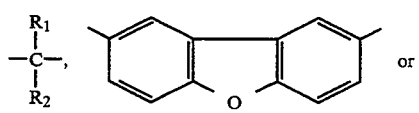

or

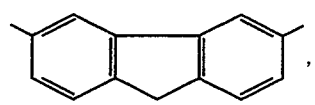

in which $R_1$ and $R_2$ independently of one another are each $C_1-C_4$alkyl, and
K and $K_1$ independently of one another are each a coupling component of the formula

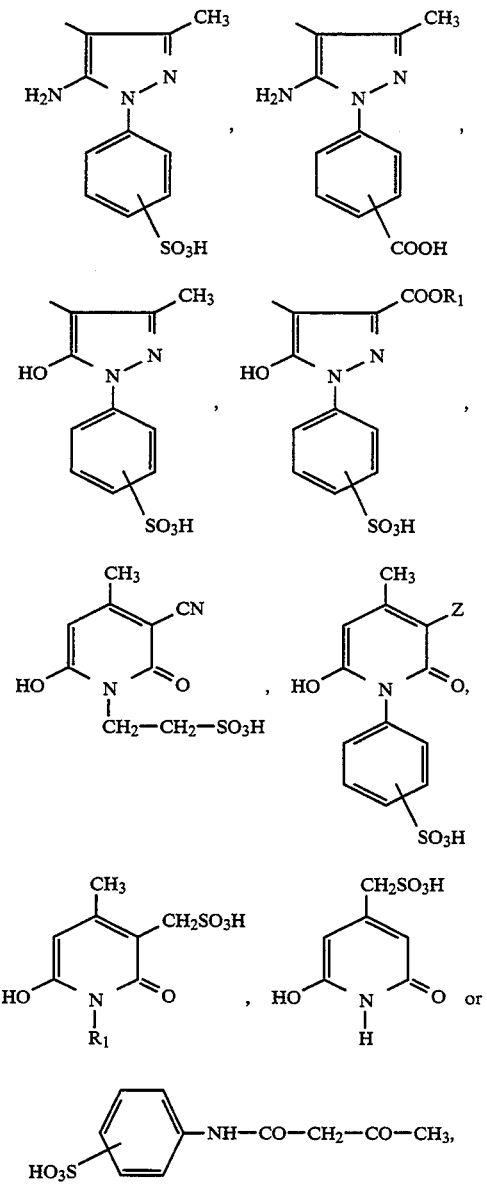

in which Z is CN, COOH, $COONH_2$ or $COOR_1$, b) a red dye of the formula

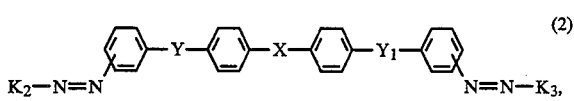

(2)

in which $K_2$ and $K_3$ independently of one another are each a coupling component of the formula

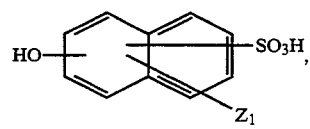

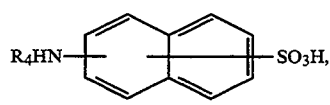

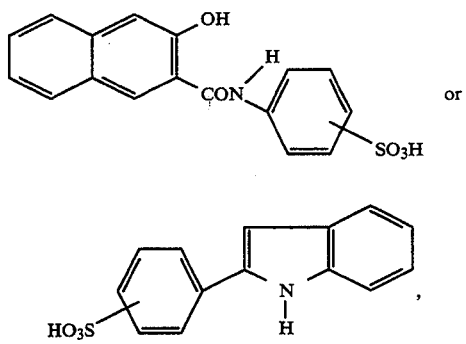

in which $Z_1$ is hydrogen, OH or $NHR_3$, in which $R_3$ is hydrogen, $C_1$-$C_4$alkyl, cyano-$C_2$-$C_4$alkyl, $C_1$-$C_4$alkylcarbonyl, aminocarbonyl, phenylcarbonyl or phenyl, it being possible for the phenyl group in the last two radicals mentioned to be substituted by $C_1$-$C_4$alkyl, $R_4$ is hydrogen or phenyl, and c) a blue dye of the formula

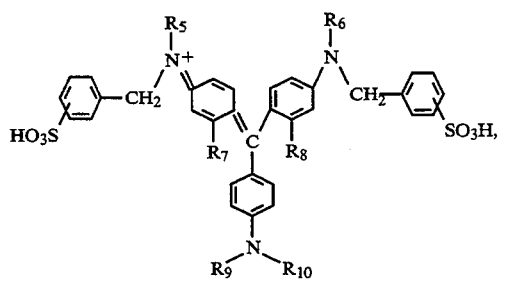

in which $R_5$, $R_6$, $R_7$, $R_8$ and $R_9$ independently of one another are each hydrogen or $C_1$-$C_4$alkyl and $R_{10}$ is hydrogen, phenyl or phenyl which is substituted by $C_1$-$C_4$alkyl or $C_1$-$C_4$alkoxy, or of the formula

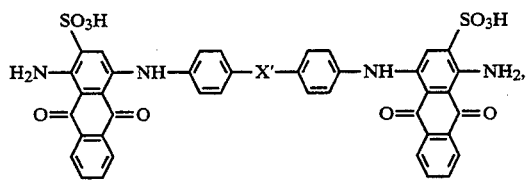

in which X' is —$C_1$-$C_4$alkylene—, —CH=CH—, —O—, —S—, —SO$_2$—, —NH—,

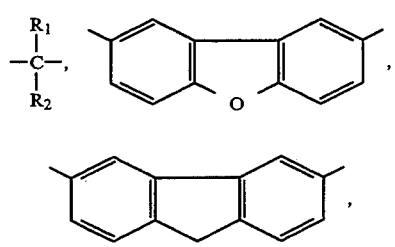

—NH—CO—,   —NH—SO$_2$—   or   —NH—CO—NH—, in which $R_1$ and $R_2$ independently of one another are each $C_1$-$C_4$alkyl, are used.

The alkyl and alkenyl groups can be linear or branched. $C_1$-$C_4$alkyl is thus methyl, ethyl, n- or iso-propyl or n-, iso-, sec- or tert-butyl. Of these, methyl and ethyl are preferred.

Alkylene groups are preferably unbranched radicals. Examples are methylene, ethylene, n-propylene or n-butylene.

Suitable alkoxy radicals are, for example, methoxy, ethoxy, propoxy, iso-propoxy, n-butoxy, iso-butoxy or tert-butoxy, but preferably methoxy or ethoxy.

A dye mixture comprising a yellow dye of the formula (1), a red dye of the formula (2) and a blue dye of the formula (3) or (3a) is preferably used for trichromatic dyeing by the process according to the invention.

In the dyes of the formula (1), Y is preferably the same as $Y_1$, and in particular they are each —SO$_2$O—.

The use of those dyes of the formula (1) in which X is

moreover is preferred.

The coupling components K and $K_1$ in the dyes of the formula (1) are preferably identical, and in particular K and $K_1$ are each a coupling component of the formula

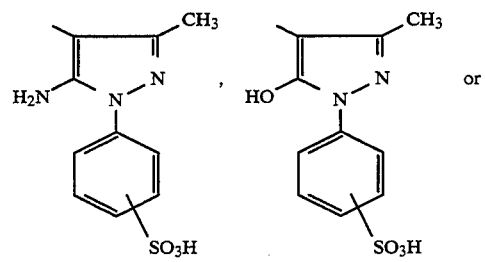

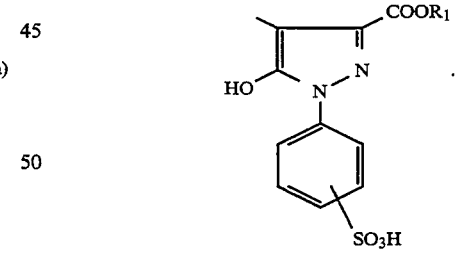

The use of those dyes of the formula (1) in which K and $K_1$ are each a coupling component of the formula

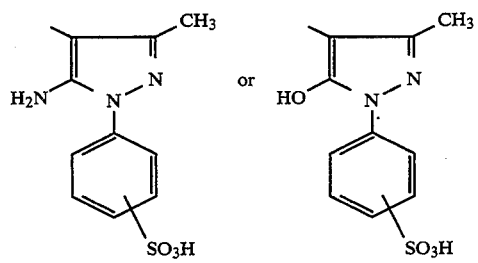

is particularly preferred.

In a particularly preferred embodiment of the process according to the invention, the yellow dye of the formula

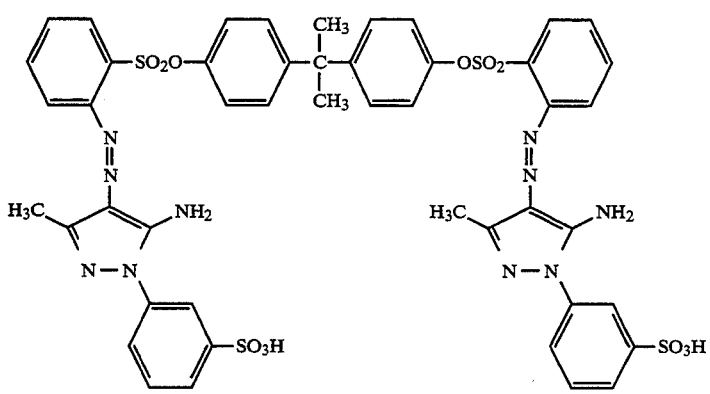

(4)

is used.

In another preferred embodiment of the process according to the invention, a red dye of the formula (2) in which Y is the same as $Y_1$, and both are preferably —$SO_2O$—, is used.

The use of those dyes of the formula (2) in which X is

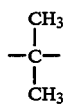

moreover is preferred.

The coupling components $K_2$ and $K_3$ in the dyes of the formula (2) are preferably identical, and in particular $K_2$ and $K_3$ are each a coupling component of the formula

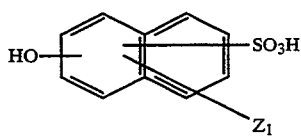

in which $Z_1$ is hydrogen, OH or $NHR_3$, in which $R_3$ is hydrogen, $C_1$-$C_4$alkyl, cyano-$C_2$-$C_4$alkyl, $C_1$-$C_4$alkylcarbonyl, aminocarbonyl, phenylcarbonyl or phenyl, it being possible for the phenyl group in the last two radicals mentioned to be substituted by $C_1$-$C_4$alkyl.

In further preferred embodiments of the process according to the invention, a red dye of the formula (2) in which $K_2$ and $K_3$ are each a coupling component of the formula

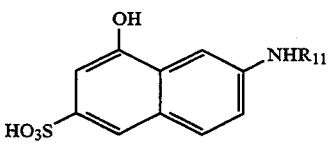

in which one of the substituents $Z_2$ and $Z_3$ is hydrogen and the other is $NHR_3$, in which $R_3$ is hydrogen, $C_1$-$C_4$alkyl, cyano-$C_2$-$C_4$alkyl, $C_1$-$C_4$alkylcarbonyl, aminocarbonyl, phenylcarbonyl or phenyl, it being possible for the phenyl group in the last two radicals mentioned to be substituted by $C_1$-$C_4$alkyl, is used.

Among these, those processes in which a red dye of the formula (2), in which $K_2$ and $K_3$ are each a coupling component of the formula

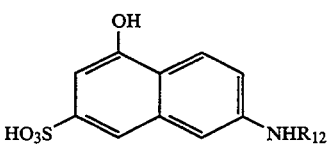

in which $R_{11}$ is hydrogen, $C_1$-$C_4$alkyl, cyano-$C_2$-$C_4$alkyl, $C_1$-$C_4$alkylcarbonyl, phenylcarbonyl, phenyl or phenyl which is substituted by $C_1$-$C_4$alkyl, or in which $K_2$ and $K_3$ are each a coupling component of the formula in which $R_{12}$ is hydrogen, $C_1$-$C_4$alkyl, aminocarbonyl, $C_1$-$C_4$alkylcarbonyl or phenylcarbonyl, are particularly preferred.

In an especially preferred embodiment of the process according to the invention, the red dye of the formula

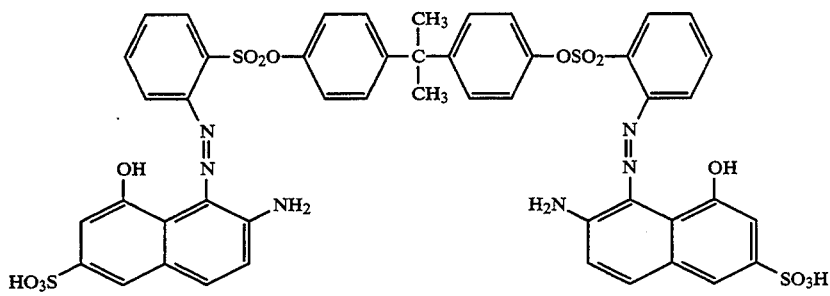

is used.

In another preferred embodiment of the process according to the invention, a blue dye of the formula (3) in which $R_5$, $R_6$, $R_7$, $R_8$ and $R_9$ independently of one another are each hydrogen or $C_1$-$C_2$alkyl and $R_{10}$ is hydrogen, phenyl or phenyl which is substituted by $C_1$-$C_2$alkyl or $C_1$-$C_2$alkoxy, or of the formula (3a) in which X' is —$C_1$-$C_4$alkylene, —CH=CH—,

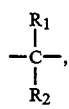

—NH—CO— or —NH—CO—NH—, in which $R_1$ and $R_2$ independently of one another are each $C_1$-$C_4$alkyl, is used.

Furthermore, the use of those dyes of the formula (3) in which $R_5$ and $R_6$ independently of one another are each $C_1$-$C_2$alkyl, $R_7$ and $R_8$ independently of one another are each hydrogen or $C_1$-$C_2$alkyl, $R_9$ is hydrogen and $R_{10}$ is phenyl or phenyl which is substituted by $C_1$-$C_2$alkyl or $C_1$-$C_2$alkoxy, or of those dyes of the formula (3a) in which X' is —$C_1$-$C_4$alkylene or

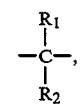

in which $R_1$ and $R_2$ independently of one another are each $C_1$-$C_4$alkyl, is preferred.

In an especially preferred embodiment of the process according to the invention, the blue dye of the formula

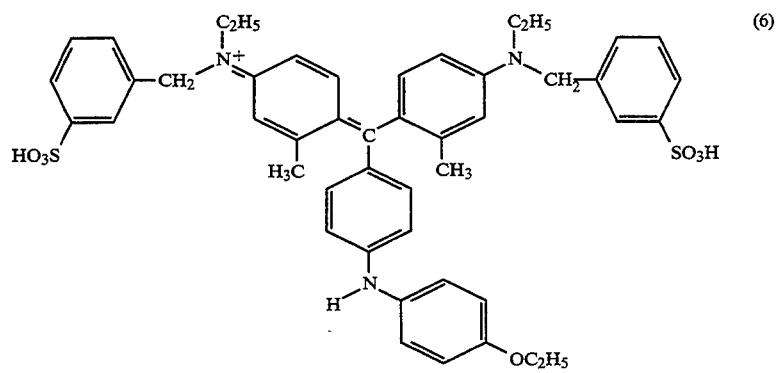

or of the formula

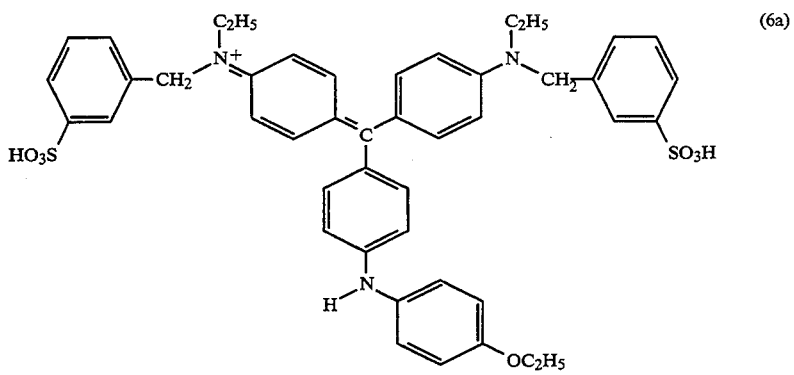

or of the formula

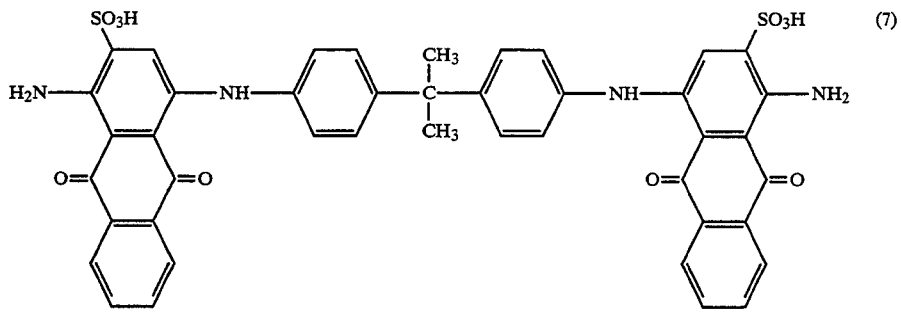

or of the formula

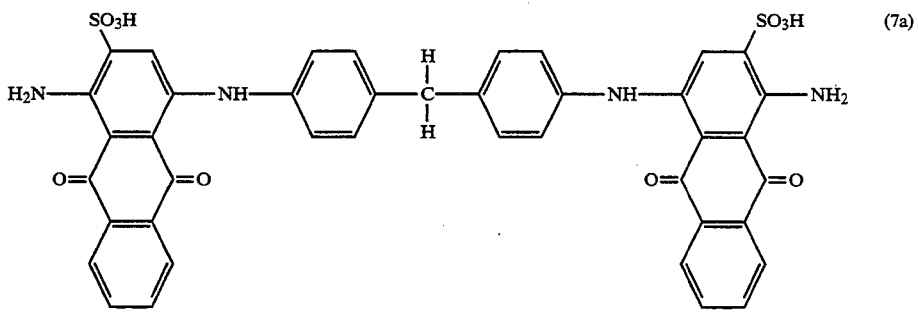

is used.

It is furthermore preferable to use in the process according to the invention at least two dyes whose parachor is between 1750 and 2200 and whose log P is between −1 and 1. The parachor is calculated here in accordance with the article by O. R. Quayle [Chem. Rev. 53 439 (1953)], and log P is the relative lipophilicity, the calculation of which has been described by C. Hansch et al. [J. Med. Chem. 16, 1207 (1973)]. In the case of the dyes of the formula (3), the influence of the charge of the dye cation is not taken into account, which results in log P values which are higher by 6 log units.

In an especially important embodiment of the process according to the invention, a dye mixture comprising the yellow dye of the formula (4), the red dye of the formula (5) and the blue dye of the formula (6) or (7) is used for trichromatic dyeing.

In addition to the dyes of the formulae (1), (2) and (3) or (3a), other dyes can also be employed in the dyeing process according to the invention. This may be advantageous, for example, if the shade which can be achieved with the dyes mentioned is to be somewhat duller or darker or in a somewhat modified colour shade. Further dyestuffs which are preferably used are those which likewise contain two sulfo or carboxyl groups and have a molecular weight of between 790 and 1100.

Because of their good capacity for combination with dyes of the formulae (1), (2) and (3) or (3a), additional dyes which are used are, in particular, orange dyes of the formula

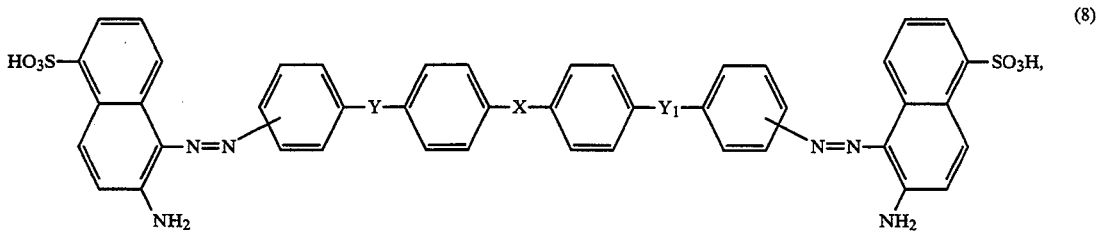

in which Y and $Y_1$ independently of one another are each —$SO_2O$—, —COO—, —CONH— or —$SO_2NH$—, and X is —$C_1$-$C_4$alkylene, —CH=CH—, —O—, —S—, —$SO_2$—, —NH—,

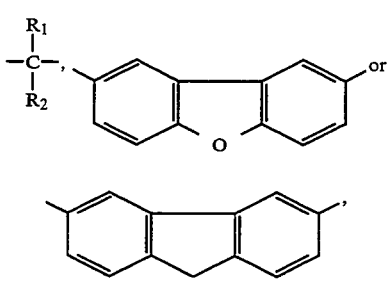

in which $R_1$ and $R_2$ independently of one another are each $C_1$-$C_4$alkyl, or brown dyes of the formula

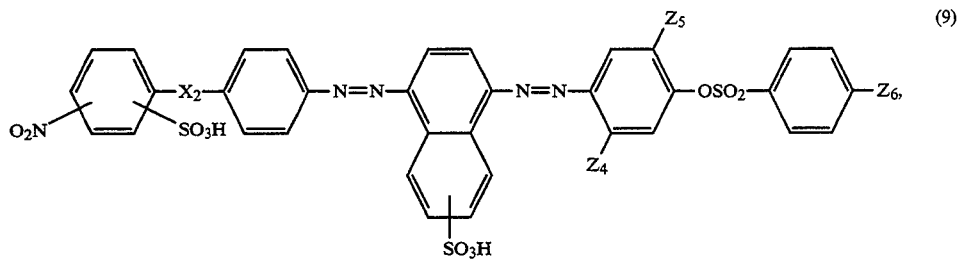

in which $X_2$ is —NH— or —O—, $Z_4$ and $Z_5$ independently of one another are each hydrogen, methyl, methoxy or chlorine and $Z_6$ is hydrogen or methyl, the sulfo group on the naphthalene nucleus being located in the 6- or 7-position, or brown dyes of the formula

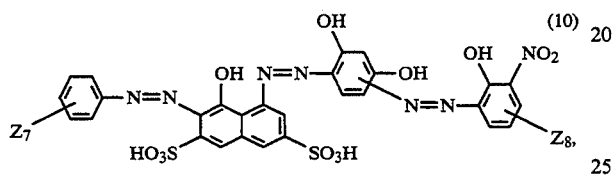

in which $Z_7$ is hydrogen, methyl, chlorine or nitro and $Z_8$ is nitro or sulfo, or the brown dye of the formula

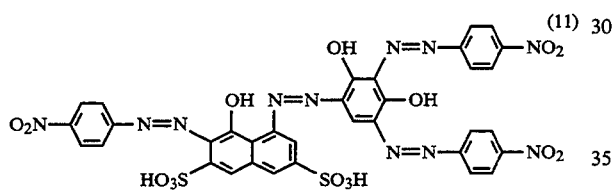

or black dyes of the formula

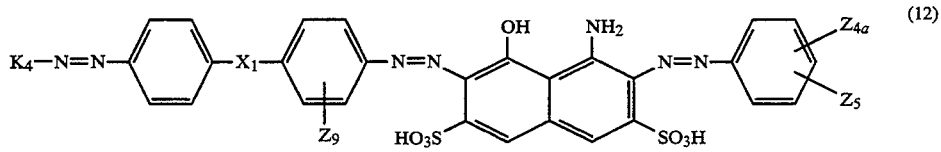

or

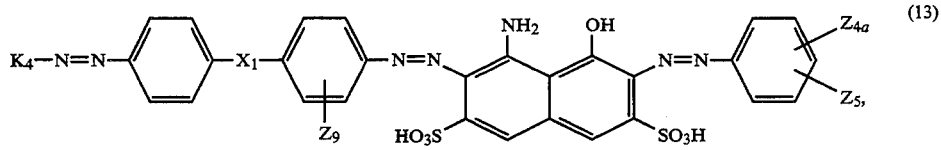

in which $K_4$ is a coupling component of the formula

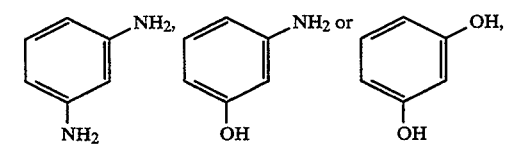

$X_1$ is —NHSO$_2$—, —CH$_2$—, —NHCO—, —O—, —S—, —NH— or —SO$_2$—, $Z_{4a}$ is hydrogen, NO$_2$ or Cl, $Z_5$ is hydrogen or, if $Z_4$ is Cl, hydrogen or Cl and $Z_9$ is hydrogen or sulfo.

Additional dyes which are preferably used are the orange dye of the formula

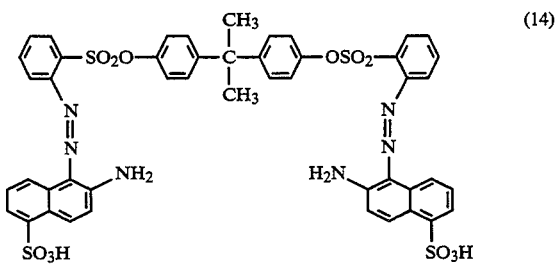

or a brown dye of the formula

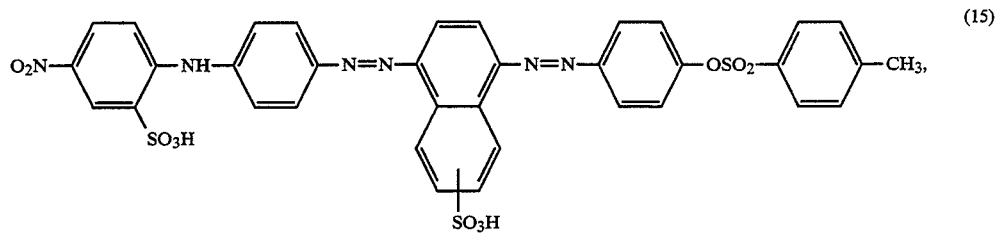

in which the sulfo group on the naphthalene nucleus is located in the 6- or 7-position, or the brown dye of the formula

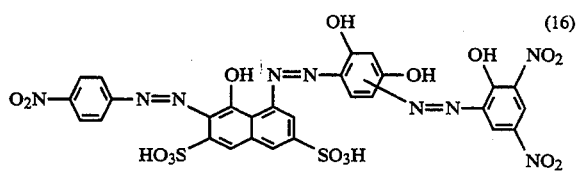 (16)

or the brown dye of the formula

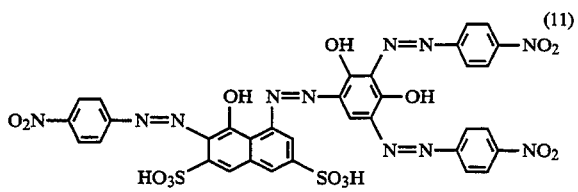 (11)

or the brown dye of the formula

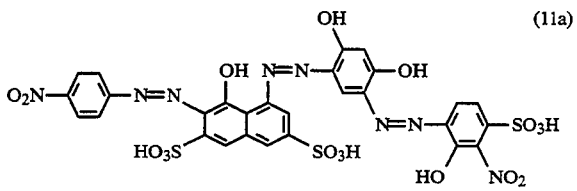 (11a)

or the black dye of the formula

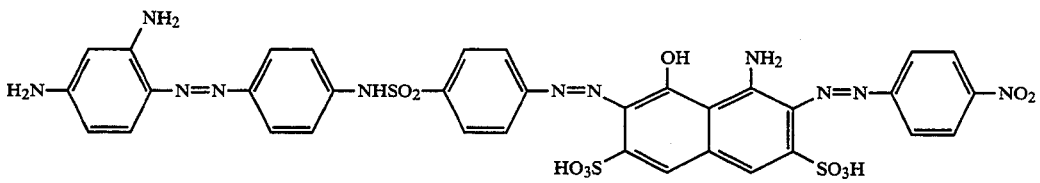 (17)

or

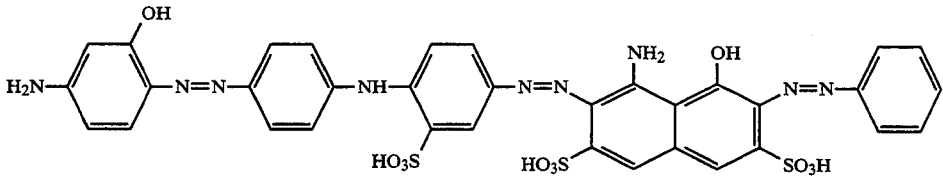 (18)

or

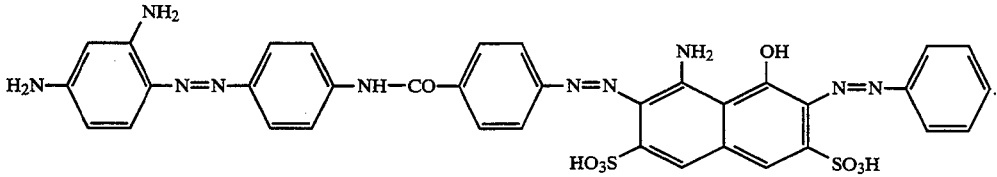 (18a)

example those substituted by $C_1-C_6$alkyl or hydroxy-$C_1-C_6$alkyl groups.

The dyes used in the process according to the invention are known or can be prepared in a manner which is known per se.

The amounts in which the dyes used according to the invention are employed in the dyebaths can vary within wide limits, depending on the desired depth of shade. In general, amounts of dye of 0.1 to 10, preferably 0.5 to 4% by weight, based on the weight of the leather to be dyed, are advantageous.

In addition to water and the dyes, the dye liquor can also contain other additives, for example acids, bases or salts for adjusting the desired pH, and dyeing assistants, for example wetting agents, fat liquoring agents, shade-deepening assistants, levelling agents, agents which accelerate penetration and/or antifoams.

The process according to the invention has the great advantage that it is suitable not only for a particular type of leather, but can be used on various types of leather, for example on chrome leather, retanned leather or suede leather from goats, cattle or pigs.

Dyeing is preferably carried out by the exhaust method, for example at a liquor ratio of 1:1.5 to 1:20, preferably 1:2 to 1:10, and at temperatures of 20° to 100° C., preferably 30° to 60° C. If desired or necessary, the leather can be subjected to a pretreatment, for example neutralisation or milling.

The dyeing time varies according to the type of leather and desired depth of shade, but is in general between 30 and 180 minutes. After the dyeing, the leather is rinsed and finished in the customary manner.

Leather dyeings in brilliant colour shades and having good fastness properties, for example light- and wet-fastnesses, are obtained by the process according to the invention.

The individual dyes are mixed with one another for use for dyeing. The dyes can be prepared here individually as stock solutions for the dyeing process, or can be formulated together in a single stock solution.

The dyes according to the invention are anionic in nature and are advantageously employed in the form of their salts, in particular alkali metal salts or ammonium salts. Alkali metal salts are, in particular, the lithium, potassium or sodium salts, and ammonium salts are also to be understood as meaning salts of organic amines, for The invention furthermore relates to trichromatic dye mixtures comprising at least one yellow dye of the formula (1), at least one red dye of the formula (2) and at least one blue dye of the formula (3) or (3a).

Preferred trichromatic dye mixtures comprise 1 to 98% by weight of a yellow dye of the formula (1), 1 to 98% by weight of a red dye of the formula (2) and 1 to 98% by weight of a blue dye of the formula (3) or (3a), in particular 10 to 70% by weight of a yellow dye of the formula (1), 10 to 50% by weight of a red dye of the formula (2) and 10 to 50% by weight of a blue dye of the formula (3) or (3a).

The examples which follow illustrate the invention without limiting it thereto. Parts and percentages are by weight. The dyes are employed in the commercially available powder or liquid form.

EXAMPLE 1

100 parts of chrome-tanned cowhide (shaved weight) are washed in 300 parts of water at 30° C. for 15 minutes and then neutralised at 30° C. for 60 minutes in a liquor comprising 300 parts of water, 2 parts of neutralising agent (Na salts of aromatic sulfonic acids and aliphatic dicarboxylic acids) and 0.5 part of sodium bicarbonate. A washing operation lasting 15 minutes in 300 parts of water at room temperature then follows.

The leather treated in this way is now dyed at 50° C. for 30 minutes in a freshly prepared liquor of 300 parts of water and 1.41 parts of the dye mixture comprising 1.06 parts of the yellow dye of the formula

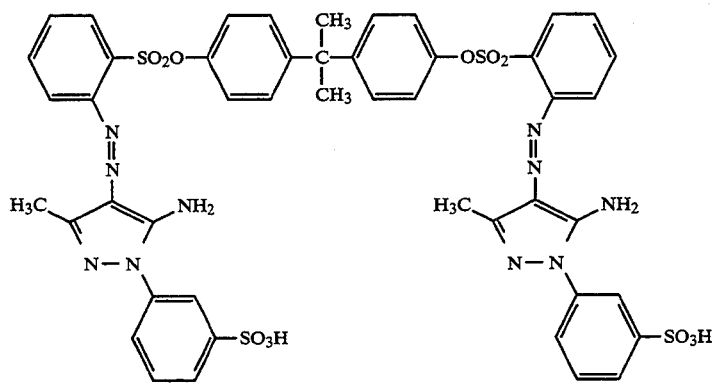

(4)

and 0.35 part of the blue dye of the formula

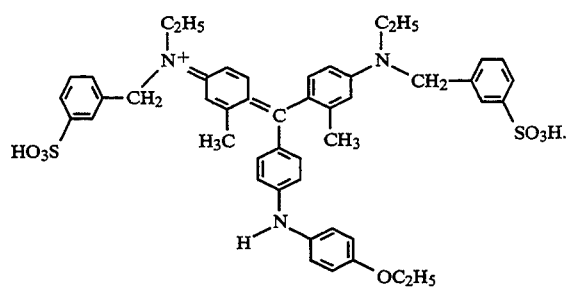

(6)

3 parts of a synthetic fat liquoring agent (preparation based on sulfonated aliphatic hydrocarbons, fatty acids and derivatives thereof) are then added to the dye liquor, and 0.5 part of 85% formic acid is added after a further 30 minutes. Dyeing is continued at an unchanged temperature for a further 30 minutes, and, after rinsing, the dyed leather is finished in the customary manner.

A level green-dyed leather having excellent fastnesses and a pure shade is obtained. The capacity of these dyes to be combined is particularly good. When the surface of the leather is ground gently, it can be seen that the two dyes dye the leather to the same depth.

EXAMPLE 2

100 parts of chrome cowhide (shaved weight) are neutralised as described in Example 1 and then treated at 30° C. for a further 60 minutes in the same liquor containing 7 parts of a liquid synthetic retanning agent (condensation products of polyphenolic sulfonic acids with formaldehyde and urea). A washing process of 15 minutes' duration in 300 parts of water at room temperature then follows. This retanned chromed cowhide is then dyed at 50° C. in a liquor comprising 300 parts of water and 2.82 parts of the dye mixture employed in Example 1. After a dyeing time of 30 minutes, 3 parts of the synthetic fat liquoring agent from Example 1 are added, and after a further 30 minutes, 1 part of 85% formic acid is added. After acidification, the treatment is continued at 50° C. for a further 30 minutes. The leather is then rinsed in cold water and finished. The resulting green dyeing is distinguished by good fastness properties and a pure shade. The capacity of the dyes to be combined is also very good on this leather, which is tested as in Example 1. Moreover, the colour shade of the dyeing largely agrees with the dyeing obtained in Example 1 with the same dye mixture on chrome cowhide which had not been retanned.

EXAMPLE 3

The procedure described in Example 2 is repeated, using 3 parts of a strongly anionic retanning agent (formaldehyde condensation product of phenolic sulfonic acids) instead of the retanning agent employed in that example, to obtain leather having a highly anionic surface.

The dyeing obtained agrees largely in colour shade with that on chrome cowhide which has not been retanned, in accordance with Example 1, and with that on retanned chrome cowhide according to Example 2.

EXAMPLE 4

The procedure described in Example 1 is repeated, using 0.734 part of a dye mixture comprising 0.477 part of the yellow dye of the formula (4), 0.077 part of the blue dye of the formula (6) and 0.180 part of the red dye of the formula

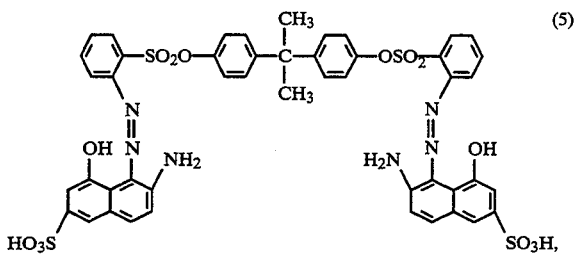

(5)

instead of the dye mixture employed in that example. Leather dyed medium brown is obtained.

The ability of the dyes to be combined is very good. When the surface of the leather is ground gently it can be seen that all the dyes dye the leather to the same depth.

EXAMPLE 5

The procedure described in Example 2 is repeated, using 1.468 parts of the dye mixture employed in Example 4, instead of the dye mixture employed in that example. A dyeing which likewise agrees in colour shade with the dyeing obtained according to Example 4 on chrome cowhide which has not been retanned is obtained.

EXAMPLE 6

100 parts of chrome cowhide (shaved weight) are neutralised and retanned as described in Example 2, and are then dyed for 30 minutes at 50° C. in a liquor comprising 300 parts of water, 1.42 parts of the dye of the formula (4) and 0.26 part of the dye of the formula (6). After 30 minutes, 3 parts of the synthetic fat liquoring agent from Example 1 are added, and after a further 30 minutes, 1 part of 85% formic acid is added. After acidification, the treatment is continued at 50° C. for a further 30 minutes.

The leather is then after-treated in a fresh bath also containing 1 part of a shade-deepening assistant (polyquaternary amine/ethylene oxide adduct) in 300 parts of water. After a treatment time of 15 minutes, half the amount of the abovementioned dyes is added to the dyebath, and dyeing is then continued at 50° C. for 15 minutes. 0.25 part of 85% formic acid is then added. Dyeing has ended after a further 20 minutes. The leather is then rinsed in cold water.

The dyeing, finished in the customary manner, is distinguished by outstanding fastnesses and a full, pure green colour shade. It is considerably fuller and deeper than a corresponding dyeing without the shade-deepening assistant. The same results are also obtained with the other dye mixtures of the dyes of the formulae (4), (5) and (6).

EXAMPLE 7

100 parts of a chrome-trained clothing suede leather (dry weight) are drummed for 60 minutes at 50° C. in a solution of 1000 parts of water and 2 parts of 24% ammonia. A washing process of 15 minutes' duration in 1000 parts of water at 50° C. then follows.

After these preparatory operations, the leather is dyed at 50° C. in a liquor of 1000 parts of water, 2 parts of 24% ammonia and 11.28 parts of the dye mixture employed in Example 1.

After a dyeing time of 60 minutes, the liquor is acidified with 4 parts of 85% formic acid, and dyeing is then continued for a further 20 minutes.

The dyed leather is finished after treatment at 50° C. for 45 minutes in a fresh bath containing 1000 parts of water, 2.5 parts of a dicyanodiaminoformaldehyde condensation product and 0.5 part of 85% formic acid. The resulting dyed leather has a pure green colour shade. It is distinguished by good fastnesses and a good covering power.

EXAMPLE 8

100 parts of chrome split suede leather (dry weight) are drummed at 50° C. for 60 minutes in 1000 parts of water and 2 parts of 24% ammonia, and then washed with 1000 parts of water at 50° C. for 15 minutes.

The leather prepared in this way is now dyed at 50° C. in a fresh liquor comprising 1000 parts of water, 2 parts of 24% ammonia and 5.64 parts of the dye mixture employed in Example 1. After 60 minutes, 4 parts of 85% formic acid are also added, and dyeing is continued at this temperature for a further 20 minutes.

The dyed leather is rinsed in cold water and finished. A pure green dyeing which is distinguished by good fastnesses and evenness of shade between the suede and flesh side is obtained.

EXAMPLE 9

The procedure described in Example 1 is repeated, using 0.70 part of a dye mixture comprising 0.37 part of the yellow dye of the formula (4), 0.08 part of the blue dye of the formula (6) and 0.25 part of the brown dye of the formula

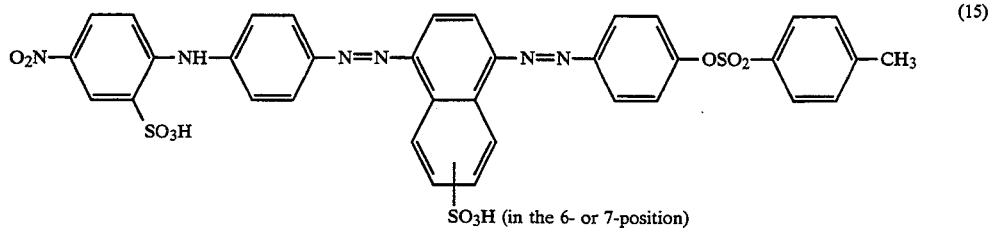

(15)

instead of the dye mixture employed in that example. A leather dyed a strong medium brown is obtained.

EXAMPLE 10

The procedure described in Example 2 is repeated, using 1.40 part of the dye mixture employed in Example 9 instead of the dye mixture employed in that example. A dyeing which likewise agrees in colour shade with the dyeing obtained according to Example 9 on chrome cowhide which has not been retanned is obtained.

EXAMPLE 11

The procedure described in Example 9 is repeated, using the dye mixture together with 1 part of an anionic dyeing assistant (sodium salt of dinaphthylmethanedisulfonic acid). A leather in which the dyeing has penetrated more is obtained.

EXAMPLES 12 TO 37

By the processes described in Examples 1, 2, 4 and 11, using the yellow dye of the formula (4) mentioned therein, the red dye of the formula (5) and the blue dye of the formula (6) in the amounts (parts) stated, leather dyeings in the shades stated are obtained.

| Example | Dyestuff (4) | Dyestuff (5) | Dyestuff (6) | Shade |
|---|---|---|---|---|
| 12 | 0.96 | 0.33 | 0.11 | reddish-tinged brown |
| 13 | 0.96 | 0.11 | 0.34 | greenish-tinged brown |
| 14 | 0.8 | 0.28 | 0.28 | reddish-tinged brown |
| 15 | 0.69 | 0.47 | 0.16 | claret |
| 16 | 0.69 | 0.15 | 0.48 | geenish-tinged grey |
| 17 | 0.48 | 0.66 | 0.11 | claret |
| 18 | 0.51 | 0.37 | 0.38 | brown |
| 19 | 0.48 | 0.11 | 0.67 | dark green |
| 20 | 0.4 | 0.55 | 0.28 | claret |
| 21 | 0.4 | 0.28 | 0.56 | dull violet |
| 22 | 0.24 | 0.77 | 0.17 | claret |
| 23 | 0.16 | 0.66 | 0.34 | bluish-tinged claret |
| 24 | 0.22 | 0.47 | 0.48 | reddish-tinged violet |
| 25 | 0.16 | 0.33 | 0.67 | bluish-tinged violet |
| 26 | 0.24 | 0.17 | 0.78 | dull blue (petrol) |
| 27 | 1.44 | 0.11 | — | orange |
| 28 | 1.28 | 0.22 | — | reddish-tinged orange |
| 29 | 0.96 | 0.44 | — | scarlet red |
| 30 | 0.64 | 0.66 | — | neutral red |
| 31 | — | 0.11 | 1.01 | blue |
| 32 | — | 0.22 | 0.9 | navy blue |
| 33 | — | 0.44 | 0.67 | violet |
| 34 | — | 0.66 | 0.45 | reddish-tinged violet |
| 35 | — | 0.88 | 0.22 | bluish-tinged claret |
| 36 | — | 0.99 | 0.11 | bluish-tinged red |
| 37 | 1.12 | 0.17 | 0.17 | yellowish-tinged brown |

EXAMPLES 38 AND 39

By the processes described in Examples 1 to 4 and 9, using the yellow dye of the formula (4) mentioned therein, the red dye of the formula (5) and the brown dye of the formula (15) in the amounts (parts) stated, leather dyeings in the shades stated are obtained.

| Example | Dyestuff (4) | Dyestuff (5) | Dyestuff (15) | Shade |
|---|---|---|---|---|
| 38 | 0.24 | 0.17 | 0.70 | brown |
| 39 | 0.16 | 0.66 | 0.3 | orange-brown |

EXAMPLE 40

By the processes described in Examples 1 to 4 and 9, using 0.1 part of the red dye of the formula (5) mentioned therein, 0.3 part of the blue dye of the formula (6) and 0.6 part of the brown dye of the formula (15), a leather dyeing in a brown shade is obtained.

EXAMPLES 41 TO 43

By the processes described in Examples 1 to 4, using the yellow dye of the formula (4) mentioned therein, the red dye of the formula (5) and the blue dye of the formula

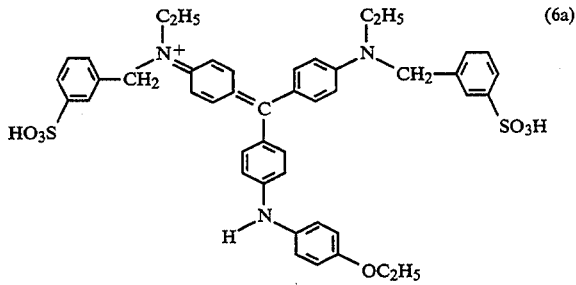

in the amounts (parts) stated, leather dyeings in the shades stated are obtained.

| Example | Dyestuff (4) | Dyestuff (5) | Dyestuff (6a) | Shade |
|---|---|---|---|---|
| 41 | 1.12 | 0.17 | 0.15 | yellowish-tinged brown |
| 42 | 0.24 | 0.77 | 0.15 | claret |
| 43 | 0.22 | 0.47 | 0.43 | reddish-tinged violet |

EXAMPLES 44 TO 47

By the processes described in Examples 1 to 4 and 41, using the red dye of the formula (5) mentioned therein, the blue dye of the formula (6a) and the orange dye of the formula

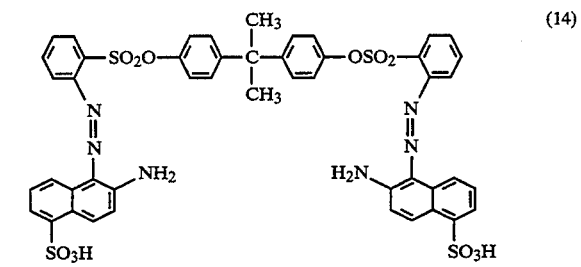

in the amounts (parts) stated, leather dyeings in the shades stated are obtained.

| Example | Dyestuff (14) | Dyestuff (5) | Dyestuff (6a) | Shade |
|---|---|---|---|---|
| 44 | 1.4 | 0.17 | 0.15 | brown |
| 45 | 1.0 | — | 0.5 | grey |
| 46 | 1.0 | 0.55 | — | scarlet |
| 47 | — | 0.55 | 0.5 | violet |

EXAMPLE 48

By the processes described in Examples 1 to 4 and 41, using 0.4 part of the red dye of the formula (5) mentioned therein, 0.5 part of the blue dye of the formula (6a) and 0.1 part of the black dye of the formula

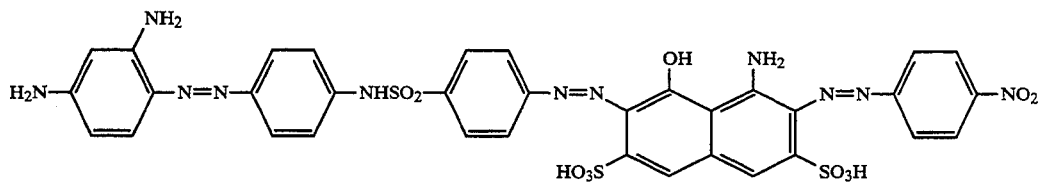

(17)

leather dyeings with a muted violet shade are obtained.

EXAMPLE 49

The procedure described in Example 1 is repeated, using 0.85 part of a dye mixture comprising 0.50 part of the yellow dye of the formula (4) and 0.35 part of the blue dye of the formula (7)

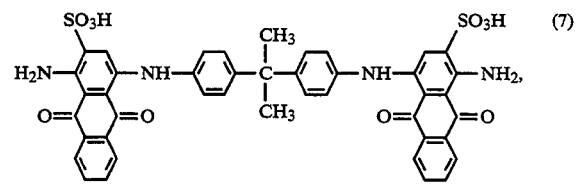

(7)

instead of the dye mixture employed therein. Green-dyed leather is obtained.

The ability of the dyes to be combined is very good. When the surface of the leather is ground gently, it can be seen that all the dyes dye the leather to the same depth.

EXAMPLE 50

The procedure described in Example 2 is repeated, using 1.70 part of the dye mixture employed in Example 49 instead of the dye mixture employed in that example. A dyeing which agrees in colour shade with the dyeing obtained according to Example 49 on chrome cowhide which has not been retanned is obtained.

EXAMPLE 51

The procedure described in Example 4 and 49 is repeated, using 0.91 part of a dye mixture comprising 0.48 part of the yellow dye of the formula (4), 0.25 part of the blue dye of the formula (7) and 0.18 part of the red dye of the formula (5) instead of the dye mixtures employed in those examples. Leather dyed medium brown is obtained.

The ability of the dyes to be combined is very good. When the surface of the leather is ground gently, it can be seen that all the dyes dye the leather to the same depth.

EXAMPLE 52

The procedure described in Example 51 is repeated, using 0.93 part of a dye mixture comprising 0.48 part of the yellow dye of the formula (4), 0.27 part of the blue dye of the formula

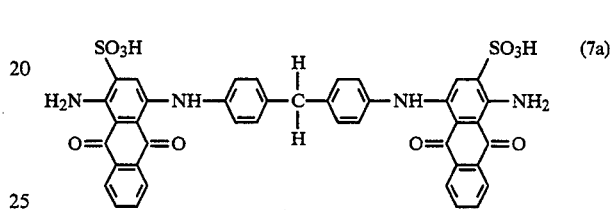

(7a)

and 0.18 part of the red dye of the formula (5) instead of the dye mixture employed in that example. Leather dyed medium brown is obtained.

The ability of the dyes to be combined is very good. When the surface of the leather is ground gently, it can be seen that all the dyes dye the leather to the same depth.

EXAMPLE 53

By the processes described in Examples 1 to 3 and 49, using 0.4 part of the red dye of the formula (5) mentioned therein, 0.5 part of the blue dye of the formula (7) and 0.1 part of the black dye of the formula

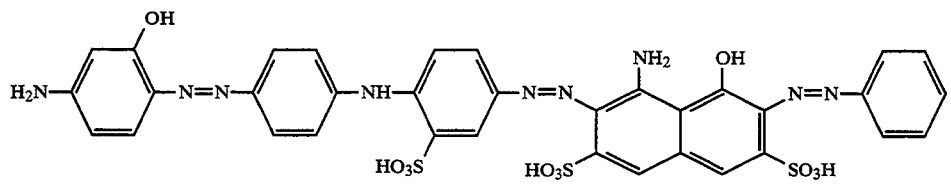

(18)

leather dyeings with a subdued violet shade are obtained.

EXAMPLE 54

By the processes described in Examples 1 to 3 and 53, using 0.4 part of the red dye of the formula (5) mentioned therein, 0.5 parts of the blue dye of the formula (7a) and 0.1 part of the black dye of the formula

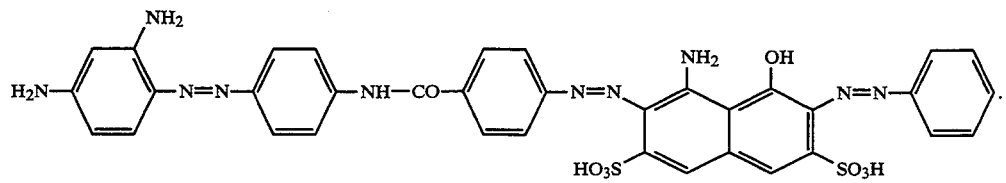

(18a)

leather dyeings with a subdued violet shade are obtained.

What is claimed is:

1. A process for dyeing leather with dye mixtures selected from at least two of the colors yellow, red and blue, which comprises applying to said leather from a dye liquor at least two metal-free dyes having in each case two sulfo or carboxyl groups and a molecular weight of between 790 and 1100, said dyes being selected from at least two of the following groups:

a) yellow dyes of the formula

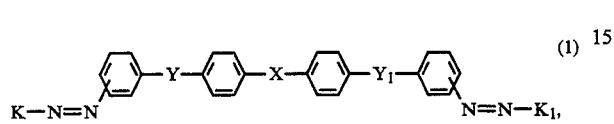  (1)

in which Y and $Y_1$ independently of one another are each $-SO_2O-$, $-COO-$, $-CONH-$ or $-SO_2NH-$, X is $-C_1-C_4$alkylene, $-CH=CH-$, $-O-$, $-S-$, $-SO_2-$, $-NH-$,

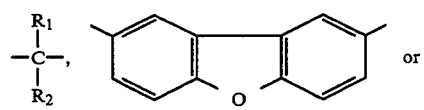 or

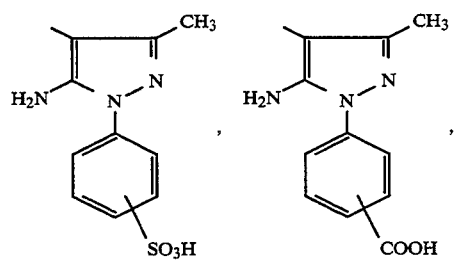

in which $R_1$ and $R_2$ independently of one another are each $C_1-C_4$alkyl, and K and $K_1$ independently of one another are each a coupling component of the formula

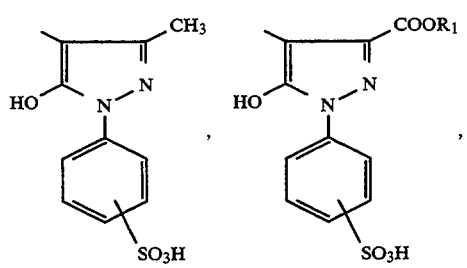

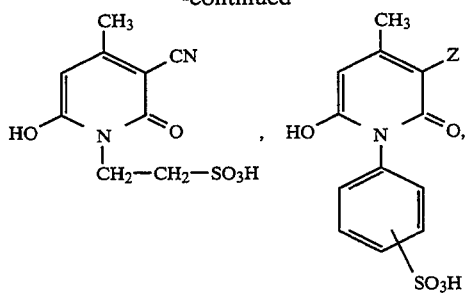

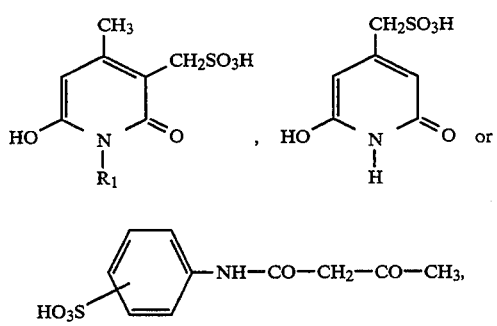

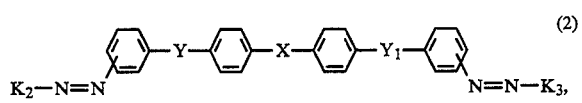

in which Z is CN, COOH, $COONH_2$ or $COOR_1$, b) red dyes of the formula

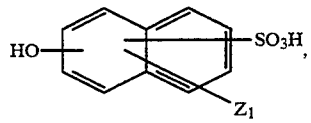  (2)

in which $K_2$ and $K_3$ independently of one another are each a coupling component of the formula

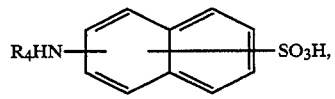

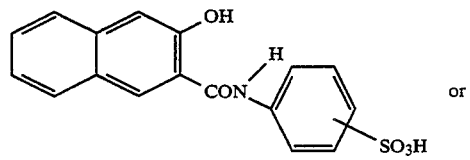

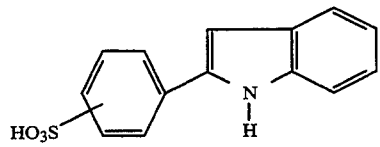

wherein $Z_1$ is hydrogen, OH or $NHR_3$, in which $R_3$ is hydrogen, $C_1-C_4$alkyl, cyano-$C_2-C_4$alkyl, $C_1-C_4$alkylcarbonyl, aminocarbonyl, phenylcarbonyl or phenyl, in which the phenyl group in the last two radicals mentioned is unsubstituted or substituted by $C_1-C_4$alkyl and $R_4$ is hydrogen or phenyl, and c) blue dyes of the formula

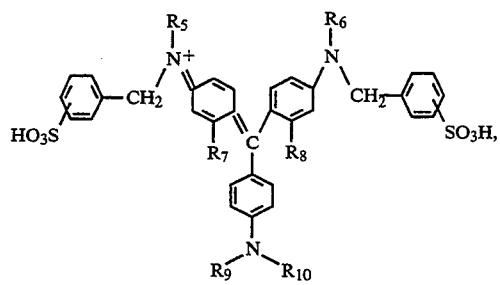

in which $R_5$, $R_6$, $R_7$, $R_8$ and $R_9$ independently of one another are each hydrogen or $C_1$-$C_4$alkyl and $R_{10}$ is hydrogen, phenyl or phenyl which is substituted by $C_1$-$C_4$alkyl or $C_1$-$C_4$alkoxy, or
blue dyes of the formula

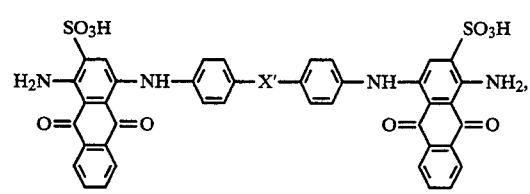

wherein $X'$ is —$C_1$-$C_4$alkylene—, —CH=CH—, —O—, —S—, —$SO_2$—, —NH—,

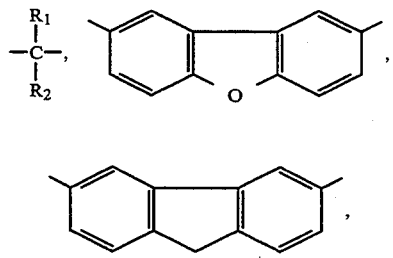

—NH—CO—, —NH—$SO_2$— or —NH—CO—NH—, in which $R_1$ and $R_2$ independently of one another are each $C_1$-$C_4$alkyl.

2. A process according to claim 1, which comprises applying a dye mixture comprising a yellow dye of the formula (1), a red dye of the formula (2) and a blue dye of the formula (3) or (3a) for trichromatic dyeing.

3. A process according to claim 1, which comprises applying a yellow dye of the formula (1) in which Y is identical to $Y_1$.

4. A process according to claim 1, which comprises applying a yellow dye of the formula (1) in which Y and $Y_1$ are each —$SO_2O$—.

5. A process according to claim 1, which comprises applying a yellow dye of the formula (1) in which X is

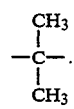

6. A process according to claim 1, which comprises applying a yellow dye of the formula (1) in which K is identical to $K_1$.

7. A process according to claim 1, which comprises applying a yellow dye of the formula (1) in which K and $K_1$ are each a coupling component of the formula

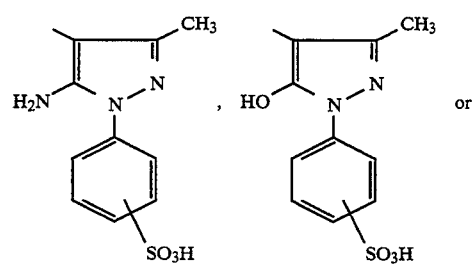

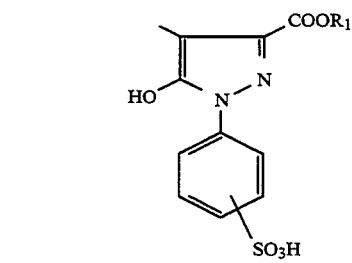

8. A process according to claim 1, which comprises applying a yellow dye of the formula (1) in which K and $K_1$ are each a coupling component of the formula

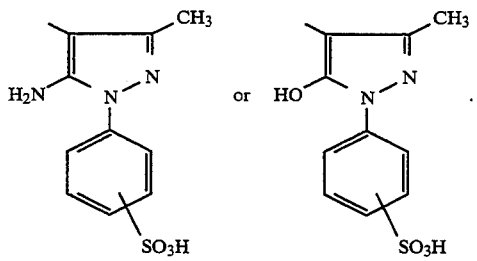

9. A process according to claim 1, which comprises applying the yellow dye of the formula

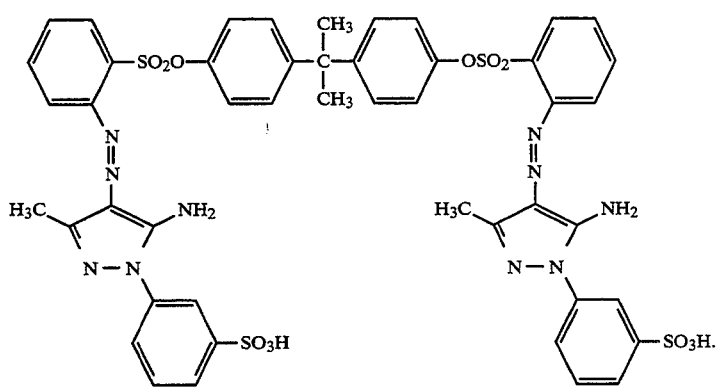

(4)

10. A process according to claim 1, which comprises applying a red dye of the formula (2) in which Y is identical to $Y_1$.

11. A process according to claim 10, which comprises applying a red dye of the formula (2) in which Y and $Y_1$ are each $-SO_2O-$.

12. A process according to claim 1, which comprises applying a red dye of the formula (2) in which X is

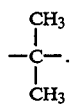

13. A process according to claim 1, which comprises applying a red dye of the formula (2) in which $K_2$ is identical to $K_3$.

14. A process according to claim 1, which comprises applying a red dye of the formula (2) in which $K_2$ and $K_3$ are each a coupling component of the formula

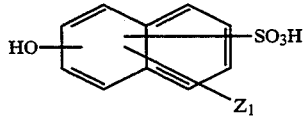

in which $Z_1$ is hydrogen, OH or $NHR_3$, in which $R_3$ is hydrogen, $C_1$-$C_4$alkyl, cyano-$C_2$-$C_4$alkyl, $C_1$-$C_4$alkylcarbonyl, aminocarbonyl, phenylcarbonyl or phenyl, it being possible for the phenyl group in the last two radicals mentioned to be substituted by $C_1$-$C_4$alkyl.

15. A process according to claim 14, which comprises applying a red dye of the formula (2) in which $K_2$ and $K_3$ are each a coupling component of the formula

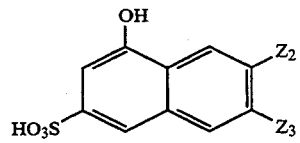

in which one of the substituents $Z_2$ and $Z_3$ is hydrogen and the other is $NHR_3$, in which $R_3$ is hydrogen, $C_1$-$C_4$alkyl, cyano-$C_2$-$C_4$alkyl, $C_1$-$C_4$alkylcarbonyl, aminocarbonyl, phenylcarbonyl or phenyl, it being possible for the phenyl group in the last two radicals mentioned to be substituted by $C_1$-$C_4$alkyl.

16. A process according to claim 15, which comprises applying a red dye of the formula (2) in which $K_2$ and $K_3$ are each a coupling component of the formula

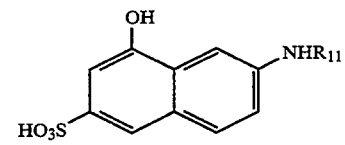

in which $R_{11}$ is hydrogen, $C_1$-$C_4$alkyl, cyano-$C_2$-$C_4$alkyl, $C_1$-$C_4$alkylcarbonyl, phenylcarbonyl, phenyl or phenyl which is substituted by $C_1$-$C_4$alkyl.

17. A process according to claim 15, which comprises applying a red dye of the formula (2) in which $K_2$ and $K_3$ are each a coupling component of the formula

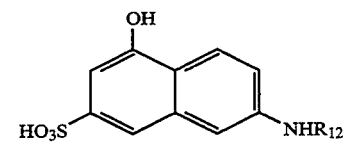

in which $R_{12}$ is hydrogen, $C_1$-$C_4$alkyl, aminocarbonyl, $C_1$-$C_4$alkylcarbonyl or phenylcarbonyl.

18. A process according to claim 1, which comprises applying the red dye of the formula

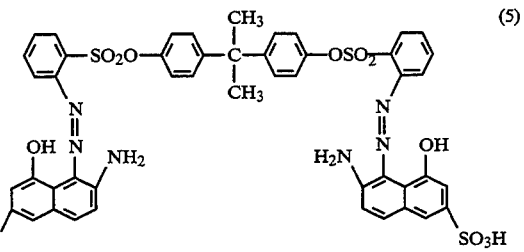

(5)

19. A process according to claim 1, which comprises applying a blue dye of the formula (3) in which $R_5$, $R_6$, $R_7$, $R_8$ and $R_9$ independently of one another are each hydrogen or $C_1$-$C_2$alkyl and $R_{10}$ is hydrogen, phenyl or phenyl which is substituted by $C_1$-$C_2$alkyl or $C_1$-$C_2$alkoxy, or a blue dye of the formula (3a) in which X' is —$C_1$-$C_4$alkylene, —CH=CH—,

—NH—CO— or —NH—CO—NH—, in which $R_1$ and $R_2$ independently of one another are each $C_1$-$C_4$alkyl.

20. A process according to claim 19, which comprises applying a blue dye of the formula (3) in which $R_5$ and $R_6$ independently of one another are each $C_1$-$C_2$alkyl, $R_7$ and $R_8$ independently of one another are each hydrogen or $C_1$-$C_2$alkyl, $R_9$ is hydrogen and $R_{10}$ is phenyl or phenyl which is substituted by $C_1$-$C_2$alkyl or $C_1$-$C_2$alkoxy, or a blue dye of the formula (3a) in which X' is —$C_1$-$C_4$alkylene or

in which $R_1$ and $R_2$ independently of one another are each $C_1$-$C_4$alkyl.

21. A process according to claim 1, which comprises applying the blue dye of the formula or of the formula

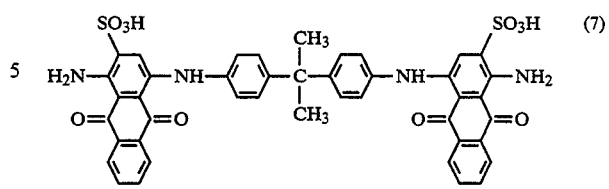

or of the formula

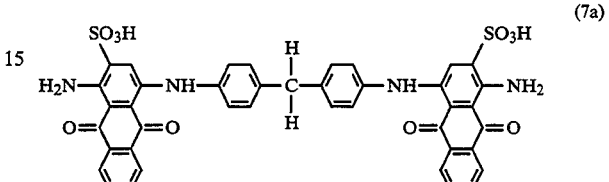

22. A process according to claim 1, which comprises applying at least two dyes, the parachor of which is between 1750 and 2200 and the log P of which is between −1 and 1.

23. A process according to claim 1, which comprises additionally applying an orange dye of the formula

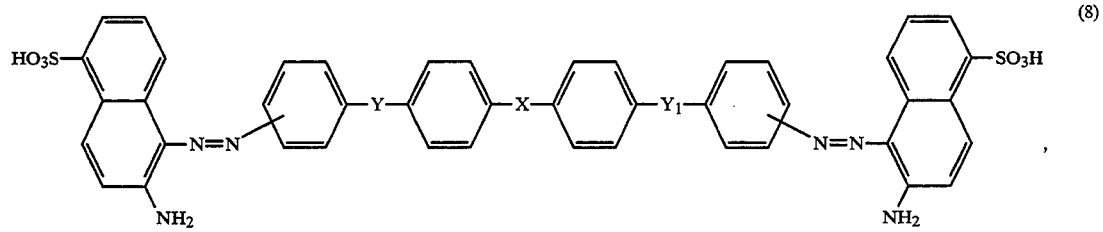

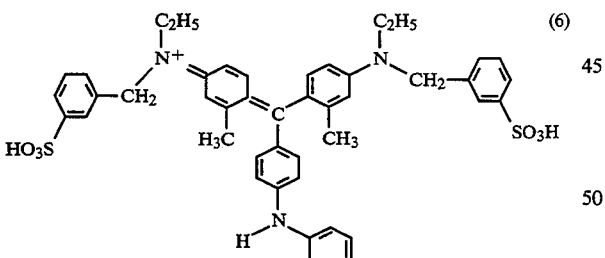

or of the formula

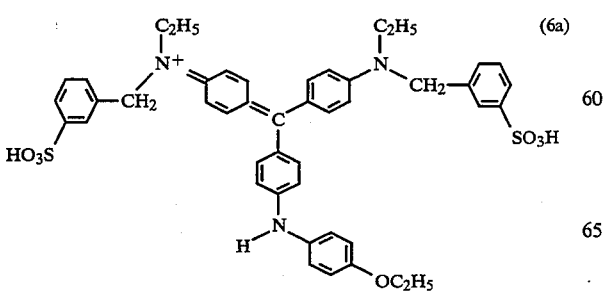

in which Y and $Y_1$ independently of one another are each —$SO_2O$—, —COO—, —CONH— or —$SO_2NH$—, and X is —$C_1$-$C_4$alkylene, —CH=CH—, —O—, —S—, —$SO_2$—, —NH—,

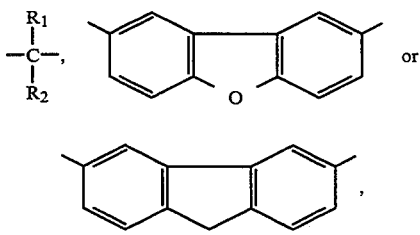

in which $R_1$ and $R_2$ independently of one another are each $C_1$-$C_4$alkyl, or a brown dye of the formula

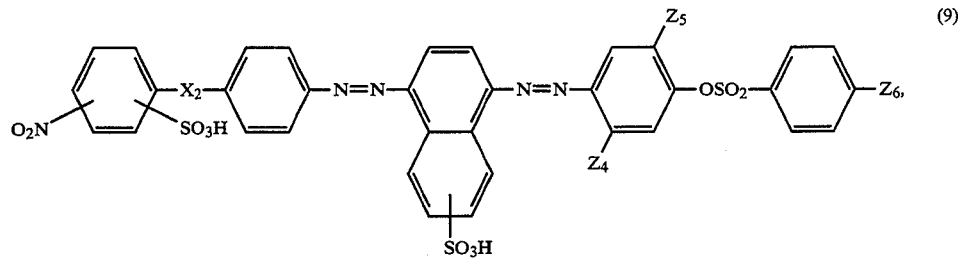

(9)

in which $X_2$ is —NH— or —O—, $Z_4$ and $Z_5$ independently of one another are each hydrogen, methyl, methoxy or chlorine and $Z_6$ is hydrogen or methyl, the sulfo group on the naphthalene nucleus being located in the 6- or 7-position, or a brown dye of the formula

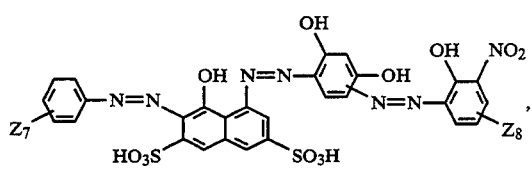

(10)

in which $Z_7$ is hydrogen, methyl, chlorine or nitro and $Z_8$ is nitro or sulfo, or the brown dye of the formula

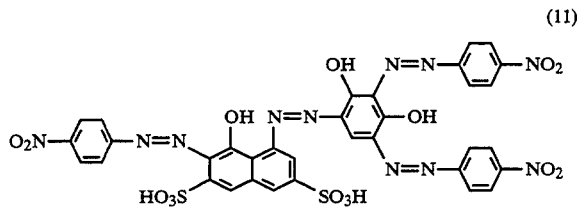

(11)

or a black dye of the formula

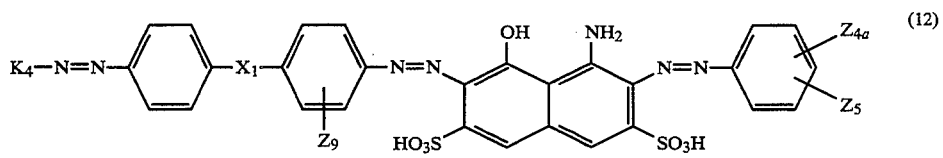

(12)

or

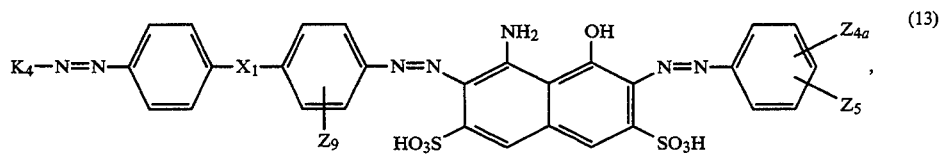

(13)

in which $K_4$ is a coupling component of the formula

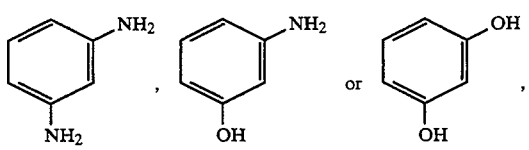

$X_1$ is —NHSO$_2$—, —CH$_2$—, —NHCO—, —O—, —S—, —NH— or —SO$_2$—, $Z_{4a}$ is hydrogen, NO$_2$ or Cl, $Z_5$ is hydrogen or, when $Z_{4a}$ is Cl, is additionally Cl and $Z_9$ is hydrogen or sulfo.

24. A process according to claim 23, which comprises additionally applying the orange dye of the formula

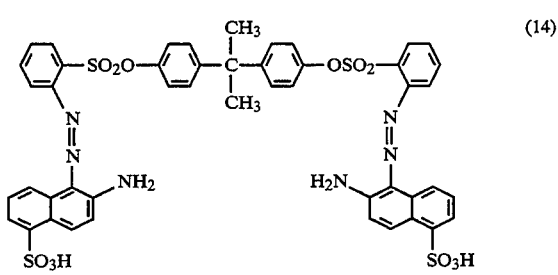

(14)

or a brown dye of the formula

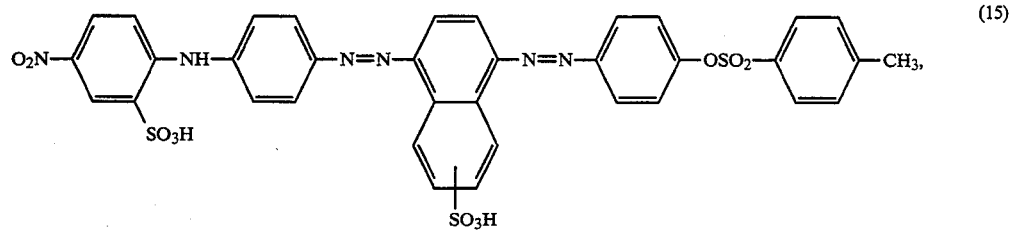
in which the sulfo group on the naphthalene nucleus is located in the 6- or 7-position, or the brown dye of the formula
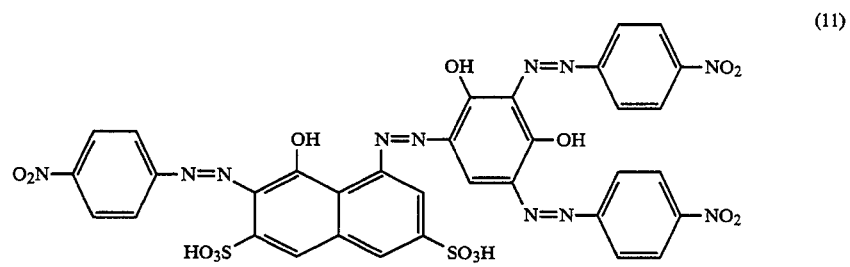
or the brown dye of the formula
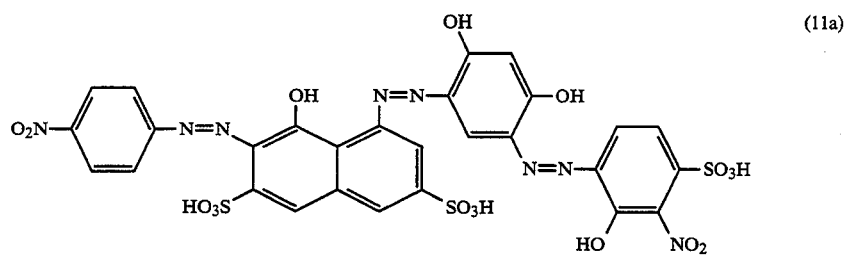
or the black dye of the formula
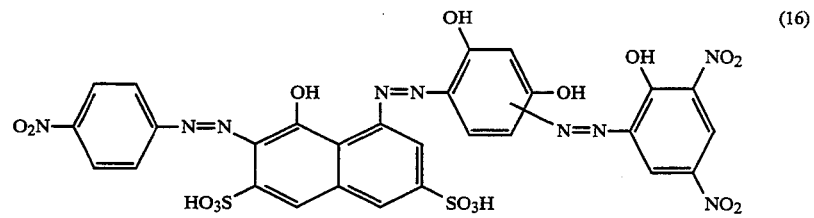
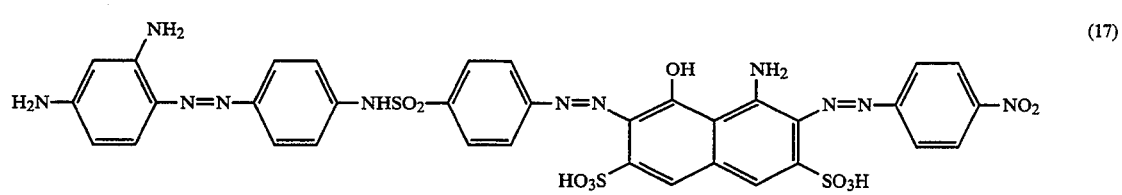
or
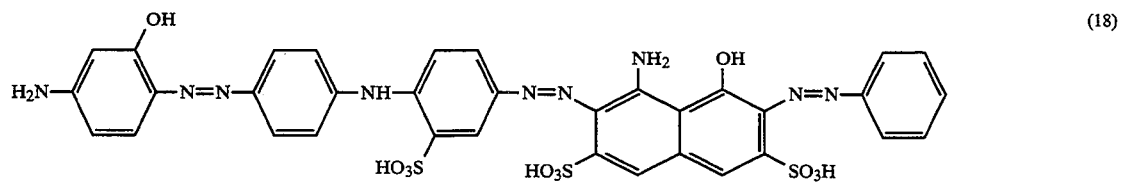
or

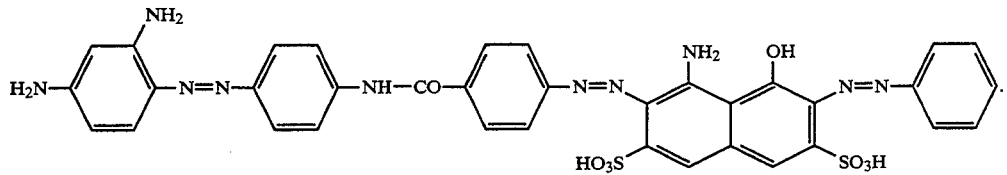

25. A process according to claim 1, which comprises applying a dye liquor is applied which additionally comprises a shade-deepening assistant.

26. A process according to claim 25, which comprises applying a dye liquor is applied which comprises an ethoxylated alkylamine as the shade-deepening assistant.

27. The leather dyed by the process according to claim 1.

28. A process according to claim 21, which comprises applying a dye mixture comprising the yellow dye of the formula

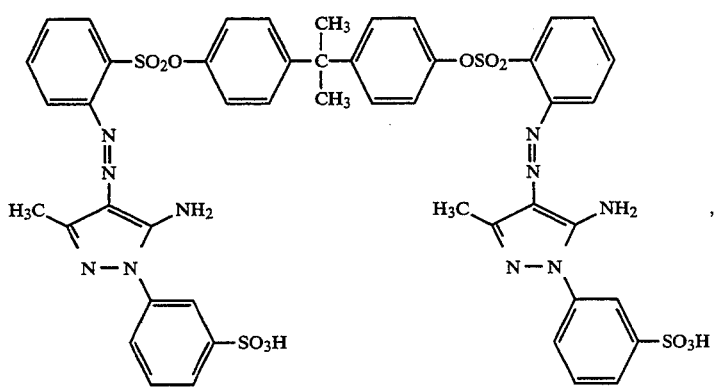

the red dye of the formula

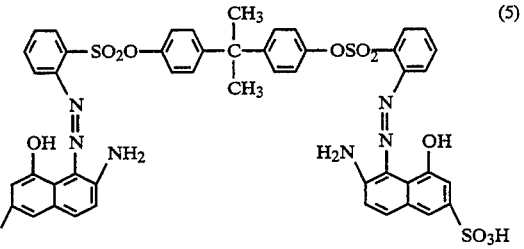

and the blue dye of the formula (6), (6a), (7) or (7a) for trichromatic dyeing.

* * * * *